Oct. 9, 1923.  
E. J. MARTEL  
1,470,237  
STEERING WHEEL SWITCH CONTROL  
Filed Dec. 16, 1919  
2 Sheets-Sheet 1

WITNESSES  
Guy M. Spring  
V. B. Hillyard

Inventor  
EDGAR J. MARTEL  
By Richard B. Owen  
Attorney

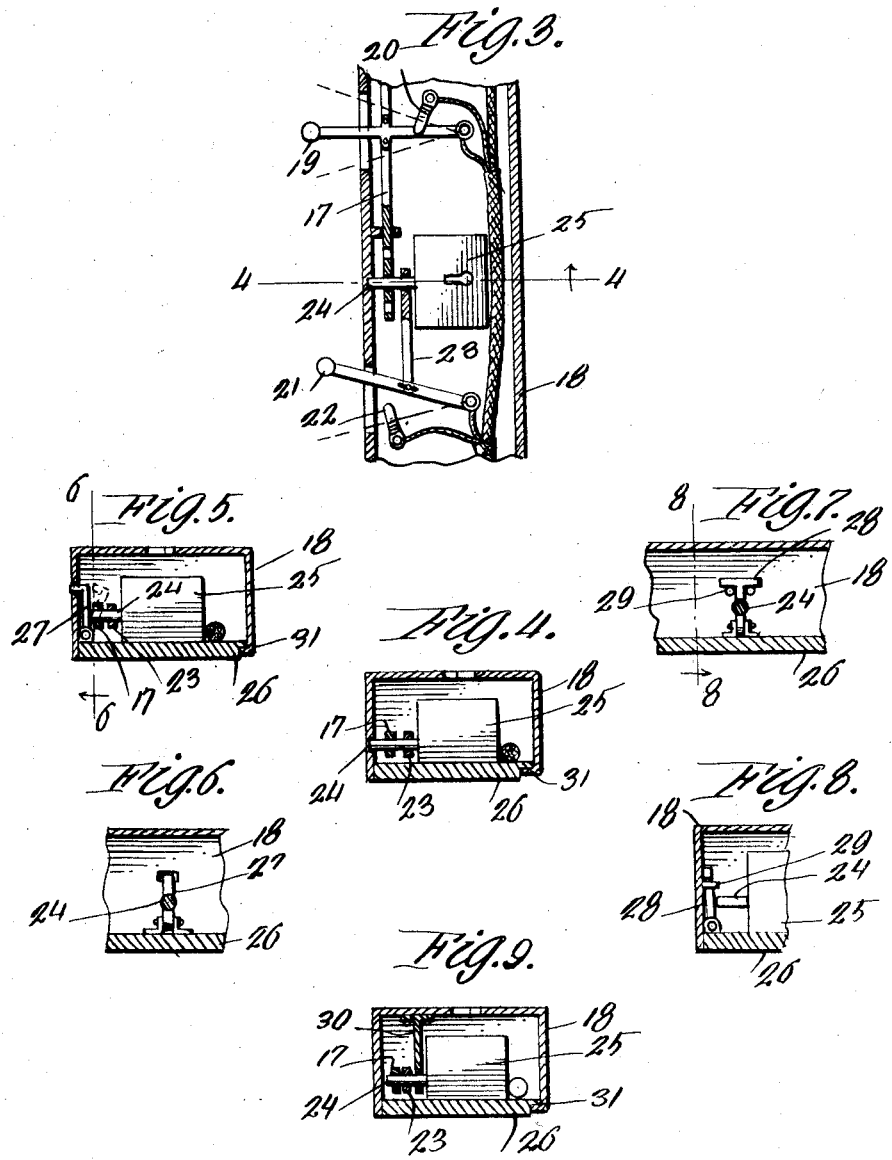

Patented Oct. 9, 1923.

1,470,237

UNITED STATES PATENT OFFICE.

EDGAR J. MARTEL, OF LACONIA, NEW HAMPSHIRE.

STEERING-WHEEL SWITCH CONTROL.

Application filed December 16, 1919. Serial No. 345,191.

*To all whom it may concern:*

Be it known that I, EDGAR J. MARTEL, a citizen of the United States, residing at Laconia, in the county of Belknap and State of New Hampshire, have invented certain new and useful Improvements in Steering-Wheel Switch Controls, of which the following is a specification.

This invention relates to electric switch controls for motor vehicles and has for its object to conveniently mount the switch mechanism on the steering wheel so as to be readily accessible at all times and under all conditions for instant operation to effect the result desired, said switch mechanism embodying locking means whereby the parts may be secured in the located position.

The drawings illustrate a preferred embodiment of my invention. However, it is to be understood that in adapting the same to meet different conditions, various changes in the form, proportion and minor details of construction may be resorted to without departing from the nature of the invention as claimed hereinafter.

Referring to the drawings hereto attached:—

Figure 3 is an enlarged sectional detail of a portion of the switch control and locking means associated therewith.

Figure 4 is a sectional detail on the line 4—4 of Fig. 3 looking in the direction of the arrows.

Figure 5 is a view similar to Fig. 4 showing a modification.

Figure 6 is a sectional detail on the line 6—6 of Fig. 5, looking to the left as indicated by the arrows.

Figure 7 is a view similar to Fig. 6 of a further modification.

Figure 8 is a sectional detail on the line 8—8 of Fig. 7, looking to the right as designated by the arrows.

Figure 9 is a sectional detail similar to Figs. 4 and 5 of a further modification.

Corresponding and like parts are referred to in the following description and indicated in the several views of the drawings by like reference characters.

Figure 1:
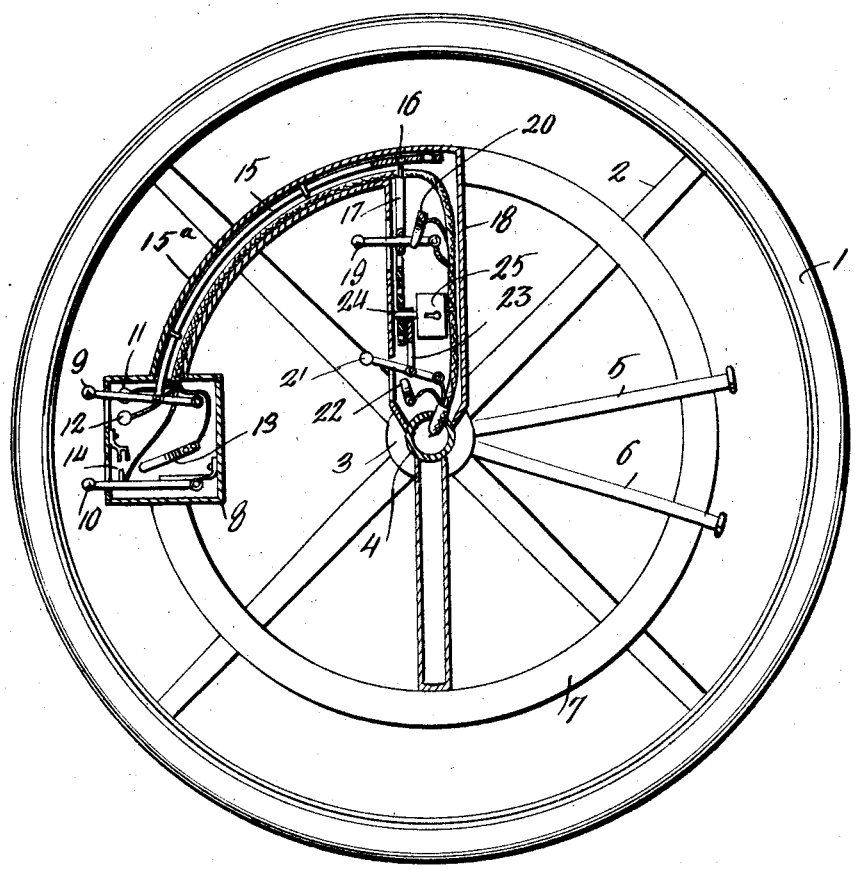
Figure 1 is a top plan view of a steering wheel embodying the invention, parts being in section to show more clearly the relative arrangement of the elements comprising the switch control mechanism.
Figure 2:
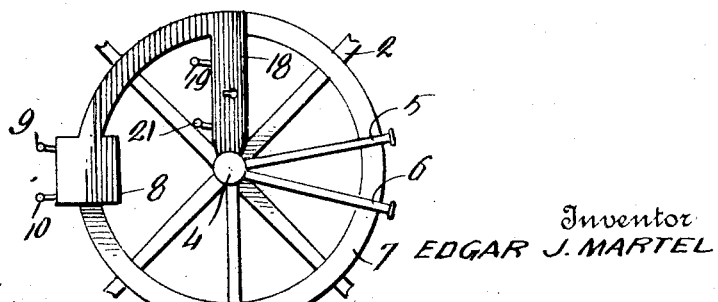
Figure 2 is a top plan view of the switch control mechanism and support therefor showing the parts on a reduced scale.

The steering wheel illustrated in Fig. 1 is of ordinary construction such as commonly employed for motor vehicles and motor boats, the same comprising a rim 1, arms 2 and a hub 3. The numeral 4 designates the steering post to which the hub of the steering wheel is secured in any desired way. The numerals 5 and 6 designate respectively the throttle and spark levers which are generally associated with the steering wheel of motor vehicles. The foregoing parts may be of any well known construction and arrangement and are illustrated simply to demonstrate the application of the invention.

A ring 7 is disposed concentric with the steering wheel 1 and is preferably secured in any convenient way to the post 4. The ring 7 may be located above or below the arms 2 as may be desired such arrangement being immaterial, so long as the ring 7 is within the ring of the steering wheel, whereby the various levers may be readily accessible. A casing 8 is disposed at a convenient point in the circumference of the rim 7 and contains ignition and light switch levers 9 and 10 respectively and adjunctive parts cooperative therewith, such as contacts 11, 12 and 13. These several contacts are relatively fixed and constitute terminals of circuits which are controlled by the respective levers 9 and 10. The contact 11 constitutes a terminal of the high or bright light, whereas the contact 12 constitutes a terminal of the low or dim light. When the switch lever 9 is moved into electric connection with the contact 11 the circuit of the high or bright lights is closed. When the switch lever 9 is moved into electric connection with the contact 12 the bright light circuit is broken and the low light circuit is closed. The switch lever 9 constitutes a terminal common to both light circuits. The contact 13 constitutes a terminal of the signal circuit and when the switch lever 10 is moved into electric connection with the contact 13 the signal or horn is sounded. The numeral 14 designates suitable catch means associated with the switch lever 10 whereby the same may be maintained in closed position if desired. A switch rod or the like 15 is connected at one end with the switch lever 9 and its opposite end is provided with openings 16 which are adapted to be engaged by a locking bolt 17. The rod 15 is slidable relative to the rim 16 and is preferably disposed within a neck 15ᵃ on said rim, the former being hollow to receive the rod. It will be observed that the switch lever 9 may be locked in the right position by the outer end of the locking bolt 17 engaging a selected opening 16 in the rod 15 in registering position.

A casing 18 is located on the ring 7 at a convenient point is connected by the neck 15ᵃ with the casing 8 and is adapted to contain a mechanism, a casing holding device and a main circuit control lever 19 whereby the lock bolt 17 may be operated and the main circuit opened or closed. The lever 19 engages the lock bolt 17 and constitutes one terminal of the main circuit. A contact 20 constituting the other terminal of the main circuit is disposed within the casing 18 to be electrically engaged by the lever 19. An ignition lever 21 constitutes one terminal of the ignition circuit, the other terminal of said circuit being represented by the contact 22 which is disposed to be electrically engaged by the switch lever 21. A switch rod 23 is connected with the switch lever 21 and moves therewith. The contiguous ends of the lock bolt 17 and member 23 are adapted to overlap and are apertured to receive a lock bolt 24 of a suitable lock mechanism disposed within the casing 18 and designated by the numeral 25. The lock mechanism 25 is of a type to be operated by means of a key. When the lock bolt 24 is withdrawn within the casing of the lock mechanism 25 so as to clear the members 17 and 23 any one or all of the switch levers 9, 19 and 21 may be operated. When the lock bolt 24 is projected into locking engagement with the members 17 and 23 the several switch levers 9, 19 and 21 may be made secure against operation. The switch levers 10 controlling the signal is free at all times so that the signal may be sounded to give warning of impending danger.

The casing 18 is adapted to be closed by means of a base 26 which is removable, but which may be retained in place by suitable locking means. As indicated most clearly in Figs. 4, 5, 8 and 9 the lock mechanism 25 is carried by the base 26 being made secure thereto in any desired way. Obviously when the lock bolt 24 is projected so as to positively engage a depression in a wall of the casing 18 as indicated in Figs. 3 and 4 the base is made secure. In the modification shown in Figs. 5 and 6, a latch 27 is pivotally connected at one end to the base 26 and its hook end is adapted to enter the opening or depression in a wall of the casing 18. The lock bolt 24 is adapted when projected to engage the latch 27 and hold it in locked engagement with the casing as indicated most clearly in Fig. 5. In the modification illustrated in Figs. 7 and 8 a catch 28 of T-form is pivoted to the base 26 and its cross head is adapted to engage pins 29 projected inward from a wall of the casing 18. The catch 28 is held in locked engagement with the pins 29 by means of the lock bolt 24 when the latter is projected. In the modification shown in Fig. 9 a bracket 30 is secured to a wall of the casing 18 and its end is apertured to receive the lock bolt 24 when the latter is projected thereby securing the cover when the lock bolt is projected. An edge portion of the cover 26 is adapted to lockingly engage the casing as indicated at 31 in Figs. 4, 5 and 9 and the opposite edge portion is made secure by the locking means in a manner herein indicated.

Having thus fully described my invention what I claim as new and desire to secure by Letters Patent, is:—

1. An electric switch control adapted to be mounted upon the steering post of a car, comprising a curvilinear supporting member above the post, a casing thereon, switch levers and locking means therefor, and locking means for the casing in said casing.

2. An electric switch control adapted to be mounted upon the steering post of a car, comprising a ring-like supporting member on the post, a multi-part casing thereon, said parts connected by a neck member, and switches and locking means therefor in said casing parts and neck member.

3. An electric switch control adapted to be mounted upon the steering post of a car, comprising a curvilinear supporting member on the post, a multi-part casing, one part of which is circumferentially disposed, and the second part radially disposed on said supporting member, and a neck-like circumferential member connecting said parts.

4. An electric switch control adapted to be mounted upon the steering post of a car, comprising a ring-like supporting member on the post, a multi-part casing thereon, switches in each casing part, and a switch rod on one of the switches in one of said casing parts and neck member, and locking means therefor in the second of said casing parts.

5. The combination with a steering post of a switch control supporting member at the upper end thereof, and an electric switch control thereon comprising a multi-part switch casing, switches in each part, a lock in one casing part for locking the switches in both casing parts.

6. The combination with a steering post of a switch control supporting member at the upper end thereof, electric switch control thereon, said control comprising a multi-part casing, one part being circumferentially disposed and the other part radially disposed relative to the post, switches in said casing parts and a lock in one casing part to lock both sets of switches.

7. The combination with a steering post of a switch control supporting member at the upper end thereof, electric switch control thereon, said control comprising a multi-part casing, one part being circumferentially disposed and the other part radially disposed relative to the post, switches in said casing parts and a lock in one casing part to lock both sets of switches, and a lock in one casing part to lock both sets of parts of the casing.

8. An electric switch control for automobiles adapted to be mounted on a post and comprising an arc-like case member, a switch containing case member at each end of the arc-like member, a light and a signal switch in one of said switch case members, an ignition and a main circuit switch in a second switch case member, a switch locking rod extended from one of the switches in one of the switch case members through the arc member to the second switch case member, and a lock on the latter member to lock the said switch rod and case.

9. An electric switch control for automobiles having in combination a post, a multi-part case member mounted thereon, one of the parts of said case member with switches therein positioned near the steering wheel post, a second part of said case member with switches therein positioned near the steering wheel rim, a switch locking rod extended from one part of the case to a second part of the case, and locking means in one part of said case member for said rod and casing.

10. An electric switch control comprising the switch case member 8, light and signal switch members 9, 10 therein, a switch case member 18 with switch levers 19, 21 therein for the ignition and main circuit switches, a curved arc-like case member 15$^a$ connecting the former case members and with them forming a segmental shaped switch control structure, a switch rod 15 having notches 16 therein in the arc-like member for the lighting switch 9, a second locking switch rod 17 in the second switch case member 18 operated by the switch 19 adapted to engage said notches, a switch locking member 23 in the case member 18 for locking the switch 21, and the lock 25 on the casing for engaging the locking rods 17 and 23.

In testimony whereof I affix my signature in presence of two witnesses.

EDGAR J. MARTEL.

Witnesses:
D. C. NORMANDIN,
J. P. MORIN.